(12) United States Patent
Jiang et al.

(10) Patent No.: US 12,015,462 B2
(45) Date of Patent: Jun. 18, 2024

(54) DEVICE, METHOD AND COMPUTER READABLE MEDIUM FOR ADJUSTING BEAMFORMING PROFILES

(71) Applicant: Nokia Technologies Oy, Espoo (FI)

(72) Inventors: Zhining Jiang, Shanghai (CN); Xiaolin Xu, Hangzhou (CN); Qianshan Wang, Hangzhou (CN); Liang Xing, Hangzhou (CN)

(73) Assignee: Nokia Technologies Oy, Espoo (FI)

( * ) Notice: Subject to any disclaimer, the term of this patent is extended or adjusted under 35 U.S.C. 154(b) by 427 days.

(21) Appl. No.: 17/435,723

(22) PCT Filed: Mar. 13, 2019

(86) PCT No.: PCT/CN2019/078016
§ 371 (c)(1),
(2) Date: Sep. 2, 2021

(87) PCT Pub. No.: WO2020/181533
PCT Pub. Date: Sep. 17, 2020

(65) Prior Publication Data
US 2022/0158703 A1  May 19, 2022

(51) Int. Cl.
*H04B 7/06* (2006.01)
*H04W 24/10* (2009.01)

(52) U.S. Cl.
CPC ......... *H04B 7/0617* (2013.01); *H04B 7/0634* (2013.01); *H04B 7/0695* (2013.01); *H04W 24/10* (2013.01)

(58) Field of Classification Search
CPC .. H04B 7/0617; H04B 7/0634; H04B 7/0695; H04W 24/10
See application file for complete search history.

(56) References Cited

U.S. PATENT DOCUMENTS

| 9,253,592 | B1 | 2/2016 | Moscovich et al. |
| 10,171,150 | B1 | 1/2019 | Marupaduga et al. |

(Continued)

FOREIGN PATENT DOCUMENTS

| CN | 108574954 A | 9/2018 |
| CN | 108900232 A | 11/2018 |

(Continued)

OTHER PUBLICATIONS

Office action received for corresponding Indian Patent Application No. 202147045266, dated Apr. 8, 2022, 6 pages.

(Continued)

*Primary Examiner* — Derrick V Rose
(74) *Attorney, Agent, or Firm* — Nokia Technologies Oy

(57) ABSTRACT

Embodiments of the present disclosure relate to an electric device, a method for adjusting beamforming profiles and computer readable medium. The electric device comprises at least one processor and at least one memory including computer program code. The at least one memory and the computer program code are configured to, with the at least one processor, cause the electric device to: obtain performance measurement information for a broadcast area where an initial beamforming profile is currently used, the initial beamforming profile being determined from a set of candidate beamforming profiles; determine, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance; and select one candidate beamforming profile from the set for the broadcast area based on the beamform- (Continued)

ing performance estimation and the performance measurement information such that an optimal beamforming performance can be obtained by using the selected candidate beamforming profile.

12 Claims, 9 Drawing Sheets

(56) References Cited

U.S. PATENT DOCUMENTS

| | | | |
|---|---|---|---|
| 2013/0090126 | A1 | 4/2013 | Xing et al. |
| 2015/0289248 | A1 | 10/2015 | Wesemann |
| 2016/0323898 | A1 | 11/2016 | Jo et al. |
| 2017/0118688 | A1 | 4/2017 | Guvenc |
| 2017/0317729 | A1* | 11/2017 | Kobayashi .......... H04W 64/006 |
| 2018/0097547 | A1 | 4/2018 | Turtinen et al. |
| 2018/0262918 | A1* | 9/2018 | Zhao .................... H04B 7/0695 |
| 2019/0014488 | A1 | 1/2019 | Tan et al. |
| 2019/0043491 | A1 | 2/2019 | Kupryjanow et al. |
| 2019/0372644 | A1* | 12/2019 | Chen ...................... H04W 88/12 |

FOREIGN PATENT DOCUMENTS

| | | |
|---|---|---|
| CN | 109194378 A | 1/2019 |
| EP | 2930966 A1 | 10/2015 |
| EP | 3373466 A1 | 9/2018 |
| JP | 2017-525181 A | 8/2017 |
| WO | 2012/072445 A1 | 6/2012 |
| WO | 2015/183472 A1 | 12/2015 |
| WO | 2019/029802 A1 | 2/2019 |

OTHER PUBLICATIONS

Alkhateeb et al., "Deep Learning Coordinated Beamforming for Highly-mobile Millimeter Wave Systems", arXiv, Nov. 18, 2018, pp. 1-42.
Klautau et al., "5G MIMO Data for Machine Learning: Application to Beam-selection Using Deep Learning", Information Theory and Applications Workshop (ITA), Feb. 11-16, 2018, 9 pages.
"AI Enables Network Intelligence ZTE AI", ZTE Corporation, 2018, pp. 1-38.
International Search Report and Written Opinion received for corresponding Patent Cooperation Treaty Application No. PCT/CN2019/078016, dated Dec. 4, 2019, 9 pages.
Office action received for corresponding Chinese Patent Application No. 201980093936.4, dated Aug. 10, 2023, 8 pages of office action and 3 pages of summary available.
Extended European Search Report received for corresponding European Patent Application No. 19918670.1, dated Sep. 15, 2022, 8 pages.
Notice of Reasons for Rejection received for corresponding Japanese Patent Application No. 2021-554718, dated Jan. 10, 2023, 5 pages of Rejection and 7 pages of Summary available.

* cited by examiner

DEVICE, METHOD AND COMPUTER READABLE MEDIUM FOR ADJUSTING BEAMFORMING PROFILES

RELATED APPLICATION

This application claims priority to PCT Application No. PCT/CN2019/078016, filed on Mar. 13, 2019, each of which is incorporated herein by reference in its entirety.

FIELD

Embodiments of the present disclosure generally relate to the field of telecommunications, and in particular, to a device, method and computer readable medium for adjusting beamforming profiles.

BACKGROUND

In a massive Multiple Input Multiple Output (mMIMO) communication network, a network device uses massive number of antenna elements to generate broadcast beams in both of horizontal and vertical dimensions so as to improve the coverage. For example, the network device may transmit a sector-specific beam or a cell-specific beam for control channels, and Cell-specific Reference Signal (CRS) in order to cover the whole cell. For another example, the network device may also transmit one or more broadcast beams for Synchronization Signal Blocks (SSBs) or Physical Broadcast Channel (PBCH) blocks in order to cover the whole cell.

Each of the broadcast beams may be determined by a broadcast beamforming profile. The broadcast beamforming profile specifies parameters for broadcast beamforming, for example, antenna weighting factors for broadcast beamforming. In turn, the broadcast beamforming profile defines an antenna array diagram (also referred to as a spatial radiation pattern) of a broadcast beam. In general, the broadcast beamforming profile has major impact on coverage in the broadcast area, interference and MU-MIMO pairing ratio and thus determines not only throughput in the broadcast area but also overall Key Performance Index (KPI). Thus, there is a need to dynamically adjust broadcast beamforming profiles of mMIMO broadcast areas in order to optimize beamforming performance.

SUMMARY

In general, example embodiments of the present disclosure provide a device, method and computer readable medium for adjusting beamforming profiles.

In a first aspect, an electric device is provided. The electric device comprises at least one processor and at least one memory including computer program code. The at least one memory and the computer program code are configured to, with the at least one processor, cause the electric device to: obtain performance measurement information for a broadcast area where an initial beamforming profile is currently used, the initial beamforming profile being determined from a set of candidate beamforming profiles; determine, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance; and select one candidate beamforming profile from the set for the broadcast area based on the beamforming performance estimation and the performance measurement information such that an optimal beamforming performance can be obtained by using the selected candidate beamforming profile.

In some embodiments, the electronic device is caused to determine the respective beamforming performance estimation by: determining a difference between a beamforming power gain vector for the initial beamforming profile and a beamforming power gain vector for a first candidate beamforming profile in the set; estimating a change in the measurement information based on the difference; and determining, based on the measurement information and the estimated change, a first beamforming performance estimation in case where the first candidate beamforming profile is used in the broadcast area.

In some embodiments, the electronic device is caused to select one candidate beamforming profile from the set by: comparing a second beamforming performance estimation in case where a second candidate beamforming profile is used in the broadcast area with a third beamforming performance estimation in case where a third candidate beamforming profile is used in the broadcast area; in response to a determination that the second beamforming performance estimation is greater than the third beamforming performance estimation, increasing a first probability that the second candidate beamforming profile is selected; in response to a determination that the second beamforming performance estimation is less than the third beamforming performance estimation, increasing a second probability that the third candidate beamforming profile is selected; and selecting the second candidate beamforming profile with the first increased probability or the third candidate beamforming profile with the second increased probability.

In some embodiments, the electronic device is further caused to update the learning model with the measurement information.

In some embodiments, each of the measurement information, the historical measurement information and the beamforming performance is associated with spatial distribution information of terminal devices in the broadcast area.

In a second aspect, there is provided a method for communications. The method comprises obtaining performance measurement information for a broadcast area where an initial beamforming profile is currently used, the initial beamforming profile being determined from a set of candidate beamforming profiles; determining, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance; and selecting one candidate beamforming profile from the set for the broadcast area based on the beamforming performance estimation and the performance measurement information such that an optimal beamforming performance can be obtained by using the selected candidate beamforming profile.

In a third aspect, there is provided an apparatus for communications. The apparatus comprises means for obtaining performance measurement information for a broadcast area where an initial beamforming profile is currently used, the initial beamforming profile being determined from a set of candidate beamforming profiles; means for determining, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance; and means for selecting one candidate beamforming profile from the set for the broadcast area based on the beamforming performance estimation and the performance measurement information such that an optimal beamforming performance can be obtained by using the selected candidate beamforming profile.

In a fourth aspect, there is provided a computer readable medium having instructions stored thereon. The instructions, when executed on at least one processor of a device, cause the device to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
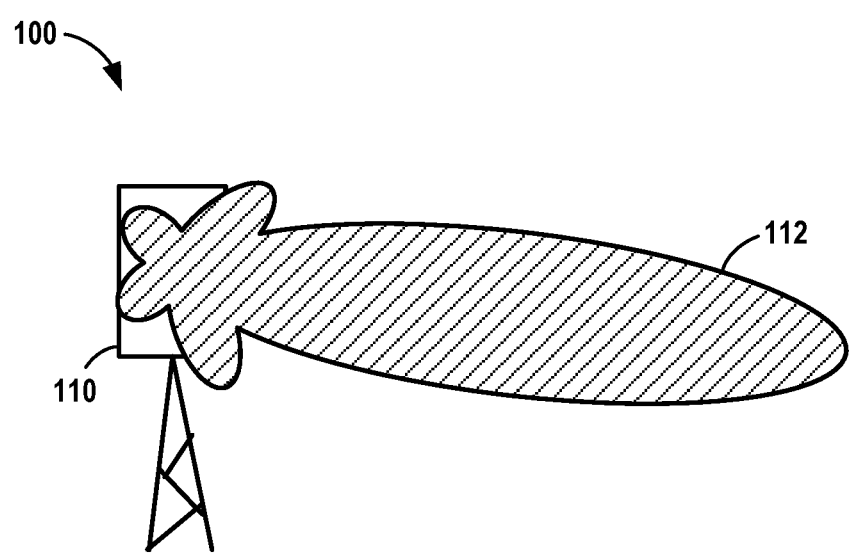
FIG. 1 shows is a schematic diagram of a sector beam in an mMIMO communication system.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, MIMO, OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a TRP, a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some example embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some example embodiments will be described with reference to UEs as examples of the terminal devices, and the terms "terminal device" and "user equipment" (UE) may be used interchangeably in the context of the present disclosure.

As used herein, the term "broadcast area" refers to an area covered by radio signals transmitted by a network device. The terminal device within the broadcast area may be served by the network device and access the communication network via the network device.

As used herein, the term "electronic device" may refer to a programmable data processing apparatus capable of, configured for, arranged for, and/or operable for communications with a network device in a communication network. Examples of the electronic device include, but are not limited to, a computer, a server. Alternatively, the electronic device may be implemented as a network device.

As used herein, the term "circuitry" may refer to one or more or all of the following: (a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As mentioned above, a network device in an mMIMO communication network may transmit broadcast beams in both of horizontal and vertical dimensions so as to improve the coverage. FIG. 1 shows is a schematic diagram 100 of a broadcast beam in an mMIMO communication network. As shown, a network device 110 transmits a broadcast beam 112. Examples of the broadcast beam 112 may include, but are not limited to, a sector-specific beam or a cell-specific beam for control channels, reference signal, or Physical Downlink Shared Channel (PDSCH) in LTE, and a broadcast beam for Synchronization Signal or PBCH block.

The broadcast beam 112 may be determined by a beamforming profile for a broadcast area. The beamforming profile for a broadcast area is also referred to as a broadcast beamforming profile. The broadcast beamforming profile may be a cell-specific beamforming profile in LTE or a sector-specific beamforming profile in LTE. In 5G New Radio, there can be one or more Synchronization Signal Blocks (SSBs) in a SSB set of a cell. Thus, the broadcast beamforming profile may be an SSB-specific or cell-specific beamforming profile depending on the broadcast area.

Figure 2A:
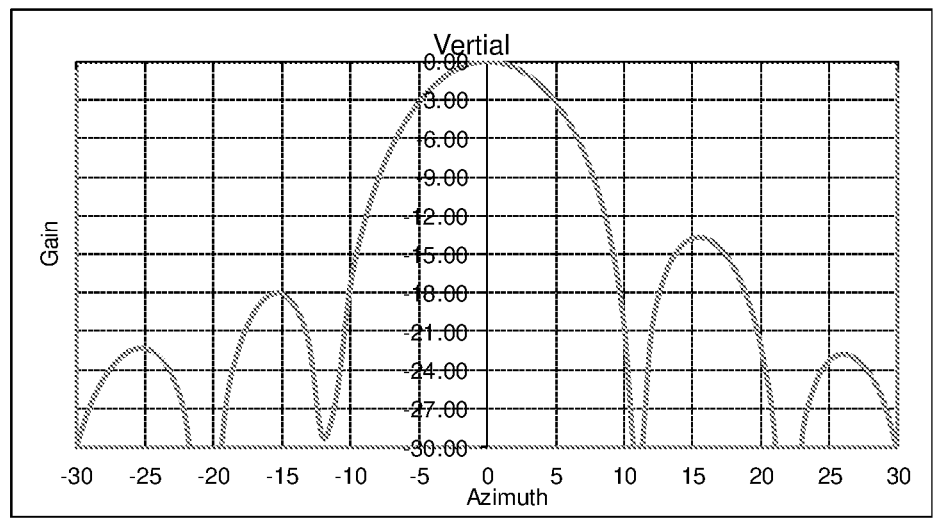
FIG. 2A shows a power gain pattern of a sector beam in a vertical dimension.
Figure 2B:
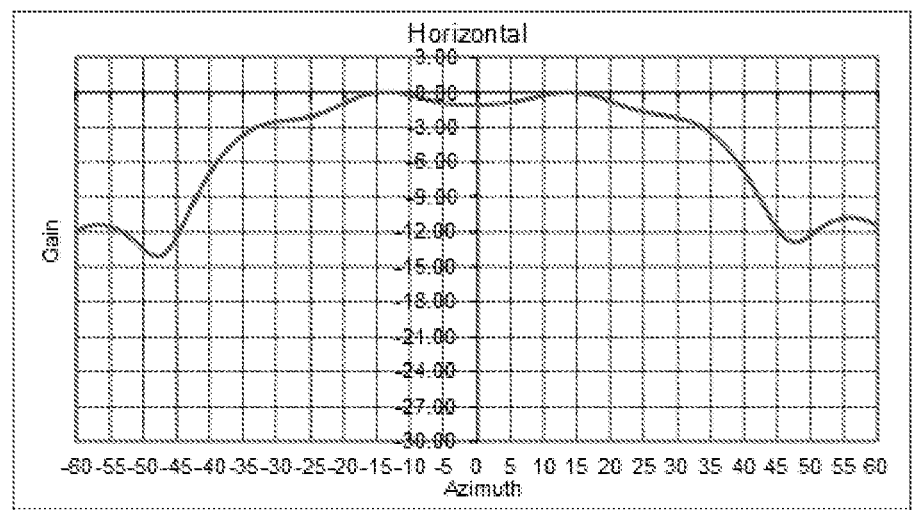
FIG. 2B shows a power gain pattern of a sector beam in a horizontal dimension.

The broadcast beamforming profile includes several characteristics, such as beam direction (aka electrical tilt in a vertical direction), Horizontal-BeamWidth (HBW), Vertical-BeamWidth (VBW) and beam power gain. The broadcast beamforming profile defines parameters for broadcast beamforming, for example, antenna weighting factors for broadcast beamforming. In turn, the broadcast beamforming profile defines an antenna array diagram of a broadcast beam. The antenna array diagram of the broadcast beam is also referred to as a spatial radiation pattern or a power gain pattern of the broadcast beam. FIG. 2A shows a power gain pattern 200 of a broadcast beam in a vertical dimension, and FIG. 2B shows a power gain pattern 205 of the broadcast beam in a horizontal dimension.

The Electrical tilt, HBW, and VBW of a broadcast beamforming profile for a network device in the mMIMO communication network are configurable. However, the VBW and/or HBW for a network device in an non-mMIMO communication network is not configurable, or has limited configurability through software in the network device.

The mMIMO coverage, capacity and performance depend on radio coverage, locations of terminal devices and traffic distribution in horizontal and vertical dimensions, CRS power allocation, and neighbouring cell interference. The broadcast beamforming profile has major impact on coverage in the broadcast area, interference and MU-MIMO pairing ratio. In turn, the broadcast beamforming profile has impact on not only broadcast area throughput but also overall KPI.

When an mMIMO communication network is deployed, because the advanced 3D beamforming and MU-MIMO technology is employed, there are many dimensions and domains for coverage, capacity and performance optimization. For example, the dimensions may include horizontal and vertical dimensions, and the domains may include time-frequency and power domains. The broadcast beamforming profile is also correlated to other Radio Resource Management parameters. Therefore, an mMIMO network device has more parameters to be adjusted than an non-mMIMO network device does. In addition, the mMIMO network device supports higher capacity than the non-mMIMO network device due to MU-MIMO. The MU-MIMO performance depends on distribution of terminal devices, traffic and interference distribution in broadcast areas.

Currently, a typical method of adjusting mMIMO broadcast beamforming for coverage, capacity and performance optimization is to adjust a broadcast beamforming profile manually and statically according to Network Planning and Optimization (NPO) experience and KPI analysis. After upgrade a legacy network device (i.e. 4T4R/8T8R) to an mMIMO network device or install a new mMIMO network device, the operator may set an initial Electrical tilt and collect the KPI result. Based on the KPI result, the operator may try a new Electrical tilt and check the KPI result afterwards. Such parameter adjusting can take long time and need manual operation. In case of site change, such optimization has to be performed several times, which is time consuming and inefficient.

In addition, the static configuration of the broadcast beamforming profile can make the overall performance in a sub-optimal state especially when those factors of terminal devices, traffic and interference are varying.

Another method of adjusting mMIMO broadcast beamforming is a Self-Organizing Network (SON) solution. In the SON solution, a SON server collects KPIs automatically and adjusts the Electrical tilt in a self-optimizing way. However, the existing performance counter and KPI do not contain the traffic, throughput, channel quality, interference distribution in a spatial dimension. Therefore, they cannot accurately predict the broadcast beamforming performance especially when MU-MIMO is enabled.

Moreover, the SON solution relies on the existing KPI to analyze the beamforming performance without the insight of mMIMO knowledge or model for mMIMO performance prediction. In the SON solution, the SON server tries a new parameter value step by step and then checks the KPI result afterward. If the parameter trial fails, the SON server will try another possible parameter value until the SON server finds an optimal parameter value.

In order to at least in part solve above and other potential problems, embodiments of the present disclosure provide a solution for adjusting beamforming profiles. According to embodiments of the present disclosure, a machine learning method is exploited to pre-train a learning model based on historical measurement information for a broadcast area. The pre-trained learning model specifies an association between the historical measurement information for the broadcast area and beamforming performance. Before adjusting an initial beamforming profile for a broadcast area, beamforming performance associated with each of candidate beamforming profiles for the broadcast area is predicted with the learning model. One of the candidate beamforming profiles is selected based on the predicted beamforming performance, such that an optimal beamforming performance can be obtained by using the selected candidate beamforming profile.

With the embodiments of the present disclosure, the convergence of performance optimization may be accelerated and the negative impact on KPI during profile adjusting may be minimized.

Figure 3:
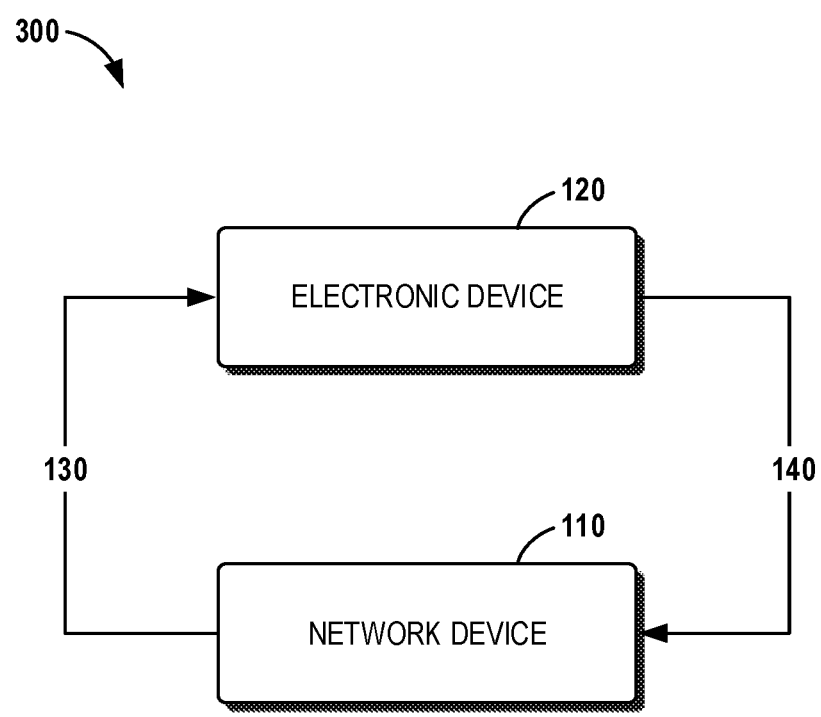
FIG. 3 shows a schematic diagram of a communication network in which example embodiments of the present disclosure can be implemented.

Principle and implementations of the present disclosure will be described in detail below with reference to FIGS. 3 to 9. FIG. 3 shows an example communication network 300 in which example embodiments of the present disclosure can be implemented. The network 300 may include the network device 110, an electronic device 120 communicating with the network device 110, and at least one terminal device served by the network device 110.

The network device 110 may be configured to obtain and process respective performance measurement information for each broadcast area. For example, the performance measurement information may comprise performance measurement information 130 for a broadcast area, which is obtained in case where a beamforming profile is currently used in the broadcast area.

The performance measurement information 130 may include both mMIMO specific performance information with corresponding angle information and common performance information.

The mMIMO specific performance information may include, but are not limited to, the per broadcast area statistics information of Media Access Control (MAC) scheduling, traffic volume, throughput, CQI, CQI offset, Modulation and Coding Scheme (MCS), Block Error Rate (BLER), MU-MIMO Physical Resource Block (PRB) pairing ratio, Rank indication distribution in horizontal and vertical dimensions over a time period. The common performance information may include, but are not limited to, the other performance statistics which can be supported by both mMIMO and non-mMIMO network devices such as E-UTRAN Radio Access Bearer (E-RAB) drop ratio, Handover success ratio, Radio Resource Control (RRC) connection setup success ratio.

The network device 110 may also be configured to transmit the performance measurement information 130 to the electronic device 120. The electronic device 120 is configured to analyze beamforming performance based on the performance measurement information 130, and determine a beamforming profile for the broadcast area.

In embodiments where the network device 110 is configured as an mMIMO network device, a broadcast beamforming profile for the mMIMO network device may be characterized by Electrical tilt, Horizontal-BeamWidth (HBW), Vertical-BeamWidth (VBW), beam power gain, and CRS power boost or de-boost. The broadcast beamforming profile for the mMIMO network device decides broadcast beamforming weights for antennas of the network device and then defines a broadcast beamforming pattern. In embodiments where the network device 110 is a non-mMIMO network device, a broadcast beamforming profile for the non-mMIMO network device may be characterized by Electrical tilt, beam power gain, CRS power boost or de-boost.

The electronic device 120 determines an optimized beamforming profile for a broadcast area of the network device 110 and transmits the profile in a command message 140 to the network device 110. Upon receiving the broadcast beamforming profile, the network device 110 transmits a response message to the electronic device 120 and applies the broadcast beamforming profile at a specific period indicated in the command message 140.

In some embodiments, the electronic device 120 may be arranged outside the network device 110, as shown in FIG. 3. In such embodiments, the electronic device 120 may be implemented as a server that communicates with the network device 110. In other embodiments, the electronic device 120 may be arranged inside the network device 110. For the purpose of discussion, in the following, some embodiments will be described by taking the electronic device 120 arranged outside the network device 110 as an example.

During an initialization phase, the network device 110 may be configured with an initial beamforming profile, the granularity of performance measurement period and lists of measurement information. During the initialization phase, the electronic device 120 may be configured with a set of candidate beamforming profiles. The initial beamforming profile is determined from the set of candidate beamforming profiles.

The granularity of performance measurement period may be determined based on the capability of the network device 110 and available transport resource. For example, the granularity of performance measurement period may be 1, 5, 10, 15, 60 minutes and so on.

The lists of measurement information may comprise a list of mMIMO specific measurement information at the grid of horizontal angle or/and vertical angle per broadcast area, and a list of common measurement information for mMIMO and non-mMIMO network devices.

For example, the list of mMIMO specific measurement information at the grid of horizontal angle or/and vertical angle per broadcast area may comprise at least one of the following:
Average of CQI
Average of MCS
Count of Downlink or Uplink scheduling grants
Sum of DL Transport Blocks with HARQ acknowledged by terminal devices (traffic volume)
Average of allocated PRBs
Average of CQI offset due to BLER control feedback loop
Average of MU-MIMO PRB pairing ratio=(Sum of DL scheduled PRBs with MU-MIMO paired UEs per TTI)/(Sum of DL scheduled PRBs per TTI).

For example, the list of common measurement information for mMIMO and non-mMIMO network devices may comprise at least one of the following:
Average cell throughput per cell
Average user throughput per cell
Average RRC Connected UEs per cell
E-RAB Radio Bearer Drop Ratio per cell
HO Success Ratio per cell.

In embodiments where the communication network 300 is an mMIMO communication network, the network device 110 may obtain the higher resolution of spatial distribution information of terminal devices in each broadcast area. In this case, the spatial distribution information of the terminal devices in each broadcast area may be associated with the performance measurement information such as traffic volume, throughput, CQI, MCS, BLER, interference level, MU-MIMO scheduling, MU-MIMO pairing ratio and so forth. In other words, the performance measurement information may include traffic volume, throughput, CQI, MCS, BLER, interference level, MU-MIMO scheduling and MU-MIMO pairing ratio over spatial horizontal and vertical dimensions. The performance measurement information can be compressed over the grid of horizontal and vertical dimensions with different angle granularities, and then suitable to different hardware capabilities, real-time and performance requirements.

With the performance measurement information associated with spatial distribution information of terminal devices in the broadcast area, more accurate beamforming performance prediction or estimation will be obtained.

In some embodiments, the above measurement information may be categorized in the grid of horizontal angle or/and vertical angle and then average (or sum) over the nearest grid. The purpose of using the performance measurement information in the spatial grid is to reduce the processing load in the network device 110 and the transport load. The granularity of the horizontal grid and the vertical grid can be configured during the initialization phase.

For example, if the granularity of horizontal grid is 5 degrees, the average CQI of horizontal grid #5n should be averaged for those scheduled terminal devices in the horizontal angle range (−2.5+5n, 2.5+5n] degree.

Table 1 shows examples of the average of CQI and the average of MCS of horizontal grid #5n, where n is zero or natural number.

TABLE 1

| Horizontal #−60 (−62.5, −57.5] | ... | Horizontal #−5 (−7.5, −2.5] | Horizontal #0 (−2.5, 2.5] | Horizontal #5 (2.5, 7.5] | ... | Horizontal #60 (57.5, 62.5] |
|---|---|---|---|---|---|---|

TABLE 1-continued

| Average of CQI (H#−60) | ... | Average of CQI (H#−5) | Average of CQI (H#0) | Average of CQI (H#5) | ... | Average of CQI (H#60) |
|---|---|---|---|---|---|---|
| Average of MCS (H#−60) | ... | Average of MCS (H#−5) | Average of MCS (H#0) | Average of MCS (H#5) | ... | Average of MCS (H#60) |
| ... | ... | ... | ... | ... | ... | ... |

For example, if the granularity of vertical grid is 1 degree, the count of Downlink scheduling grants of vertical grid #m should count those scheduled UEs in the horizontal angle range (−0.5+m, 0.5+m] degree.

Table 2 shows examples of the average of CQI and the average of MCS of vertical grid #1m, where m is zero or natural number.

TABLE 2

| Vertical #−20 (−20.5, −19.5] | Average of CQI (V#−20) | Average of MCS (V#−20) | ... |
|---|---|---|---|
| ... | ... | ... | ... |
| Vertical #−1 (−1.5,−0.5] | Average of CQI (V#−1) | Average of MCS (V#−1) | ... |
| Vertical #0 (−0.5, 0.5] | Average of CQI (V#0) | Average of MCS (V#0) | ... |
| Vertical #1 (0.5, 1.5] | Average of CQI (V#1) | Average of MCS (V#1) | ... |
| ... | ... | ... | ... |
| Vertical #20 (19.5, 20.5] | Average of CQI (V#20) | Average of MCS (V#20) | ... |

Figure 4:
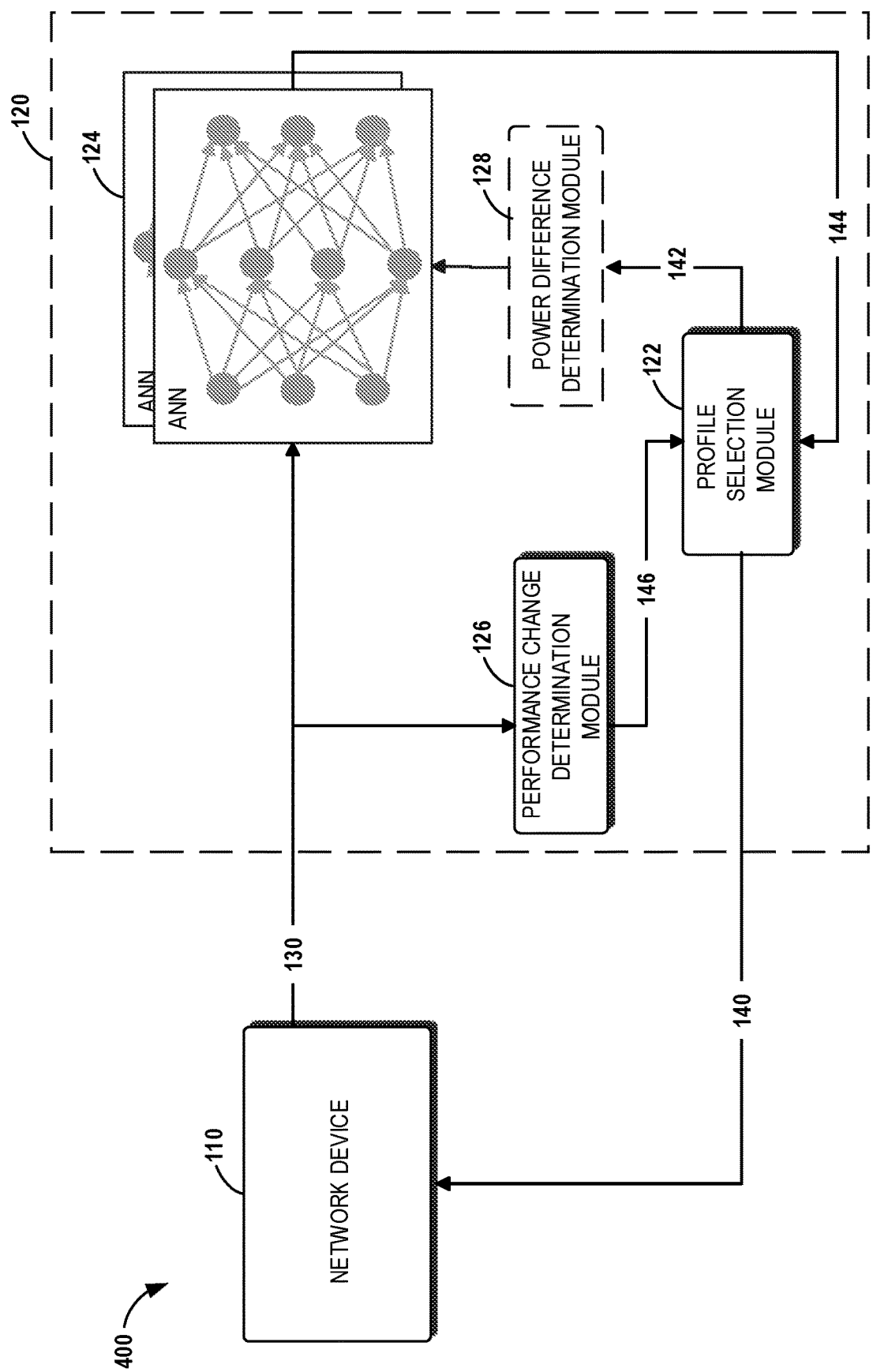
FIG. 4 shows a schematic diagram of another communication network in which example embodiments of the present disclosure can be implemented.

FIG. 4 shows a schematic diagram of a communication network 400 in which example embodiments of the present disclosure can be implemented. The communication network 400 can be considered as an example implementation of the communication network 300 as shown in FIG. 3.

As shown in FIG. 4, the communication network 400 comprises the network device 110 and the electronic device 120. The electronic device 120 comprises a profile selection module 122, a performance estimation module 124 and a performance change determination module 126.

The profile selection module 122 is configured to provide the set of candidate beamforming profiles 142 for the broadcast area to the performance estimation module 124.

The performance estimation module 124 is configured to obtain from the network device 110 the performance measurement information 130 for a broadcast area where an initial beamforming profile is currently used. The performance estimation module 124 is also configured to determine, based on the performance measurement information 130, the initial beamforming profile, each candidate beamforming profile in the set of candidate beamforming profiles and a learning model, a respective beamforming performance estimation 144 in case where a respective candidate beamforming profile is used in the broadcast area. The learning model specifies an association between historical measurement information for the broadcast area and beamforming performance. The beamforming performance may include coverage and capacity in a broadcast area, such as traffic volume, average number of RRC connected terminal devices, average cell throughput, average user throughput, spectrum efficiency and so on. The determination of the respective beamforming performance estimation 144 will be described later.

The performance change determination module 126 is configured to determine a change in beamforming performance due to adjusting of a broadcast beamforming profile.

The profile selection module 122 is also configured to select one candidate beamforming profile from the set of candidate beamforming profiles based on the beamforming performance estimation 144 and the performance measurement information, such that an optimal beamforming performance can be obtained by using the selected candidate beamforming profile. Upon selecting, the profile selection module 122 may transmit the selected profile in the command message 140 to the network device 110.

In some embodiments, the profile selection module 122 may employ the combination of Reinforcement Learning algorithm and Artificial Neural Network (ANN) to select a beamforming profile for a broadcast area according to the dynamic change of performance measurement information for the broadcast area.

Q-learning algorithm is an example of Reinforcement Learning algorithm. In some embodiments, the profile selection module 122 may employ the Q-learning algorithm to adjust a broadcast beamforming profile according to the observed measurement information such as throughput and E-RAB drop ratio. ANN is based on deep learning, which is used to model the experience and knowledge for the prediction of beamforming performance from the measurement information, which will be described later.

In the Q-learning algorithm, the state "s" may be defined as a broadcast beamforming profile. The state "s" may be represented by the combination of several sub-states (s_tilt, s_HBW, s_VBW, s_power_loss), where s_tilt represents the possible Electrical tilt supported by mMIMO antenna array, and s_tilt may be in range of [−10 degrees, 10 degrees], for example;

s_HBW represents the possible HBW supported by mMIMO antenna array, and s_HBW may be 65, 45, or 90 degrees, for example;

s_VBW represents the possible VBW supported by mMIMO antenna array, and s_VBW may be 10 or 30 degrees, for example; and s_power_loss represents to enable either power loss or power loss-less for broadcast beamforming weight.

The action "a" is to change from one broadcast beamforming profile to another broadcast beamforming profile. For example, one action may be "increase E-tilt by 2 degrees, change HBW from 65 degrees to 45 degrees, keep the VBW unchanged, and keep power loss broadcast beamforming weight". To simply the state-action space and avoid of abrupt change of a broadcast beamforming profile, the actions may be restricted in a subset so as to allow to change only one feature of a broadcast beamforming profile in one action in avoid of simultaneous change of E-tilt, HBW, VBW, broadcast beamforming power.

For example, the set of actions A={no change, increase E-tilt by 1 degree, decrease E-tilt by 1 degree, increase E-tilt by 2 degrees, decrease E-tilt by 2 degrees, HBW 65 degrees→45 degrees, HBW 45 degrees→65 degrees, HBW 65 degrees→90 degrees, HBW 90 degrees→65 degrees, change from power loss to power loss-less, change from power loss-less to power loss}.

The Q function is associated with an action in the given state: Q (state, action).

Once an action is selected and executed, the state transits from $s_t$ to $s_{t+1}$, the $Q(s_t, a_t)$ is updated as the following Equation (1):

$$Q(s_t,a_t) \leftarrow Q(s_t,a_t) + a(s_t,a_t) \cdot (R_{t+1} + \gamma \max_a Q(s_{t+1},a_t) - Q(s_t,a_t)) \quad (1)$$

where Q (s, a) represents the function of evaluation actions, $R_{t+1}$ represents the immediate reward received from the performance measurement information after adjusting the broadcast beamforming profile at t+1, $\alpha(s_t, a_t)$ represents learning rate, $0 \le \alpha(s_t, a_t) \le 1$, γ represents the discount factor indicating the importance of future rewards relative to immediate reward.

In some embodiments, the profile selection module 122 may be configured to maintain a cumulative change (i.e., Q(s, a)) in beamforming performance due to adjusting of the broadcast beamforming profile. For example, the profile selection module 122 may update Q(s, a) based on the above Equation (1).

The immediate reward $R_{t+1}$ may represent a change in beamforming performance after changing a broadcast beamforming profile to another broadcast beamforming profile. In other words, the immediate reward $R_{t+1}$ may represent a change of the observed objective value after taking the action of adjusting the broadcast beamforming profile. The performance change determination module 126 may determine the immediate reward $R_{t+1}$ based on the following Equation:

$$R_{t+1} = \text{Objective\_value}_{t+1} - \text{Objective\_value}_t \quad (2)$$

The Objective function may be defined for the single optimization objective or multiple objectives. For example, for single objective optimization, Objective_value may be average cell throughput, average user throughput, spectrum efficiency and so on.

Objective value may be also a function of KPI metric. For example, for E-RAB drop ratio, the corresponding objective function may be defined the penalty of E-RAB drop rate as the following:

$$\text{Objective\_value} = f(x) = \begin{cases} 0, & x < \text{low\_threshold} \\ \text{penalty}_{high}, & x > \text{high\_threshold} \\ \text{penalty}_{low}, & \text{else} \end{cases} \quad (3)$$

where x represents the E-RAB drop ratio, $\text{penalty}_{high} < \text{penalty}_{low} < 0$.

Objective function may be also defined for the optimization of multiple objectives. For example, for the optimization of both average cell throughput and the E-RAB drop ratio, the objective function may be defined as the sum of the reward of average cell throughput and the penalty of the E-RAB drop ratio:

$$\text{Objective\_value} = g(\text{average cell throughput}) + f(\text{E-RAB drop ratio}) \quad (4)$$

Different kinds of objective function may be defined for different optimization targets and the requirements. Three Examples of objective function may be discussed below.

Figure 5:
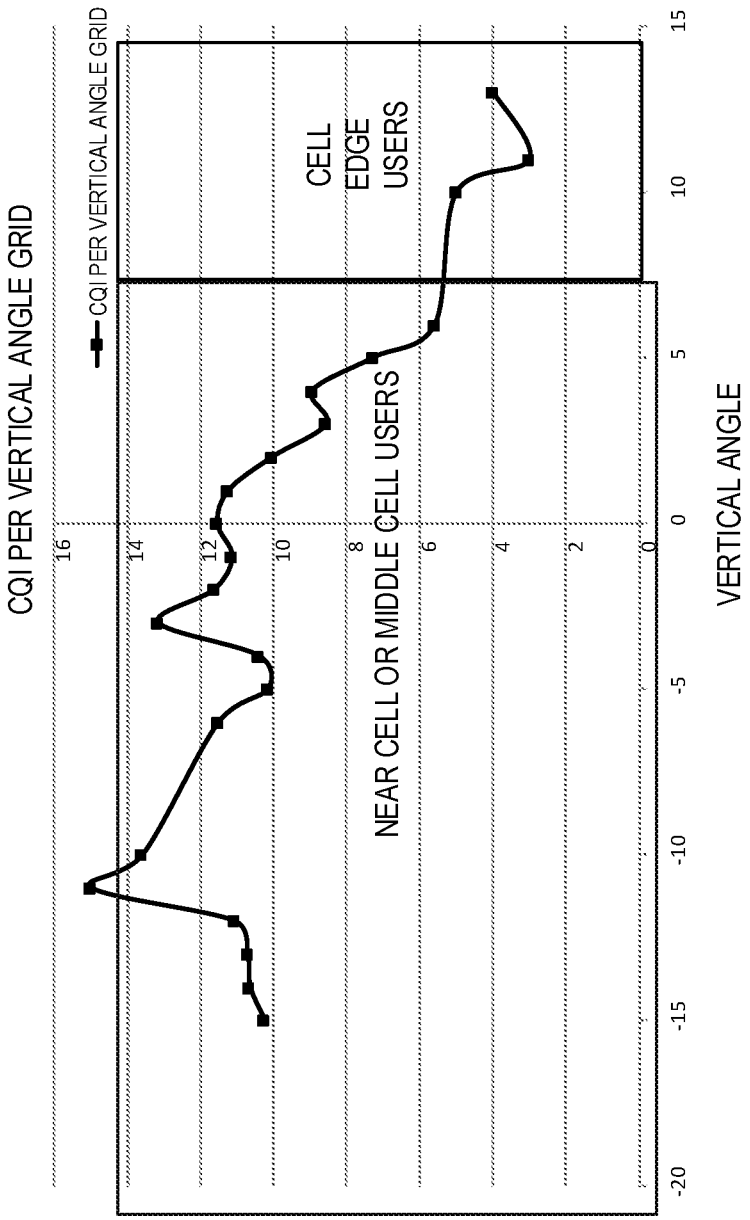
FIG. 5 shows a schematic diagram of Channel Quality Indicator (CQI) per vertical angle grid in accordance with some example embodiments of the present disclosure.
Figure 6:
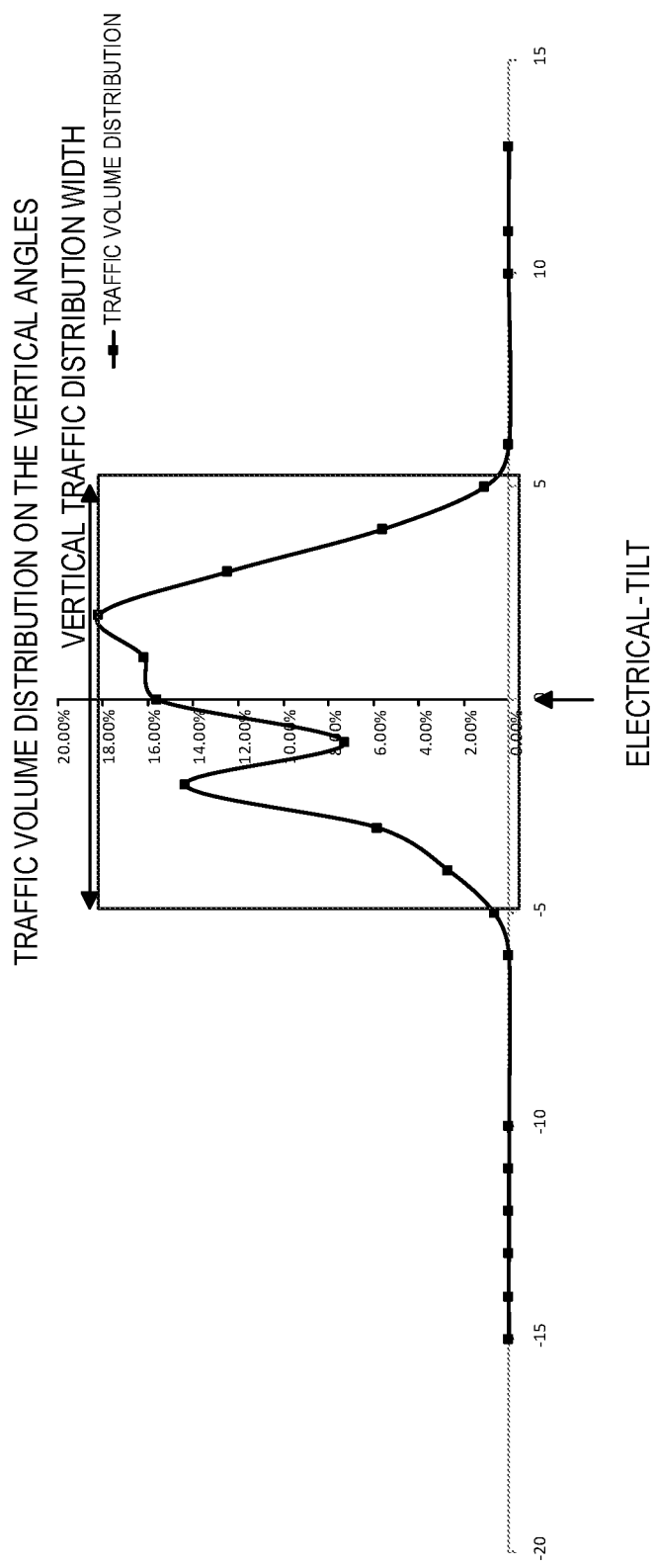
FIG. 6 shows a schematic diagram of traffic volume distribution on vertical angles in accordance with some example embodiments of the present disclosure.

Example 1, the average cell throughput may be optimized but the cell edge throughput is not compromised. Then, cell edge throughput can be part of objective function. For example, the cell edge throughput can be defined as the lowest 5% user throughput at the horizontal or vertical angle grid, as shown in FIG. 5.

Example 2: the average cell CQI for cell coverage may be optimized and the average cell edge CQI for cell edge users may be optimized. The average cell CQI can be defined as the average CQI for all of the cell users weighted by the ratio of DL scheduling grants. In this example, the average cell CQI may be represented as below:

$$\text{avg\_cell\_CQI} = \sum_{j \in Vertical\_angles} CQI_j \cdot \text{Scheduling\_ratio}_j \quad (5)$$

The average cell edge CQI can be defined as the average CQI for the cell edge users weighted by the ratio of DL scheduling grants. The cell edge users can be defined as those terminal devices at the vertical angle greater than an angle threshold. In this example, average cell edge CQI may be represented as below:

$$\text{avg\_cell\_edge\_CQI} = \sum_{j \in Vertical\_angles} CQI_j \cdot \text{Scheduling\_ratio}_j \quad (6)$$

Example 3: the traffic distribution in the horizontal or vertical angles may be optimized. For high building scenario, the VBW need to cover larger vertical angle range than VBW of macro cell. The Vertical Traffic Distribution Width can be defined as the vertical angle span for 95% traffic volume in the cell. In addition, it can be used for the optimization of VBW and the MU-MIMO pairing in the vertical angles. The similar Horizontal Traffic Distribution Width can be defined be defined as the horizontal angle span for 95% traffic volume in the cell.

During the performance measurement phase, Q(s, a) associated with some state-action pairs may be initialized based on the received performance measurement information. In some embodiments, the profile selection module 122 may update Q(s, a) upon receiving updated performance measurement information from the network device 110 after the execution of an action of adjusting the broadcast beamforming profile.

To accelerate the update of Q(s, a), the performance estimation module 124 may be used to predict the beamforming performance (e.g. cell throughput) for Q(s, a) values of some state-action pairs which have not been explored, or have been obsoleted due to the change of one or more terminal devices and traffic distribution. For example, a state-action pair may comprise an initial broadcast beamforming profile and a change from the initial broadcast beamforming profile to a candidate broadcast beamforming profile. The profile selection module 122 may provide the state-action pair to the performance estimation module 124. The performance estimation module 124 may predict, based on the performance measurement information 130, the initial beamforming profile, the candidate beamforming profile and a learning model, beamforming performance in case where the candidate beamforming profile is used in the broadcast area.

In the traditional Q-learning learning, in order to balance the exploration and exploitation policy, the action selection is based on ε-greedy policy as represented by the Equation (7):

$$\varepsilon - \text{greedy policy } \pi(s_t, a_t) = \begin{cases} \text{random}(a_t), \text{ with probability } \varepsilon \\ \max_a Q(s_t, a_t), \text{ with probability } 1-\varepsilon \end{cases} \quad (7)$$

The ε-greedy policy randomly selects one action with the probability of ε, or else selects the action of the best Q(s, a) value with the probability of 1−ε. ε is a probability, which may be changed in range of [0, 1]. In the exploration phase, some states haven't been experienced or the corresponding performance data is obsolete due to change of terminal devices and traffic distribution. Therefore, the random selection of action (i.e., the random selection of a broadcast beamforming profile) may slow down the convergence to the optimal action.

In some embodiments, the E-greedy policy is improved by prioritizing those actions with potential higher objective value based on the performance estimations of the performance estimation module 124. In the exploration phase, for those states which haven't been experienced or the corresponding performance data are obsolete, the objective value after executing a new action may be predicted by the performance estimation module 124 before the action is selected. The probability that the action is selected may be adjusted accordingly to priorities of those actions with potential higher objective values.

For example, the profile selection module 122 compares a first beamforming performance estimation in case where a first candidate beamforming profile is used in the broadcast area with a second beamforming performance estimation in case where a second candidate beamforming profile is used in the broadcast area. If it is determined that the first beamforming performance estimation is greater than the second beamforming performance estimation, the profile selection module 122 increases a first probability that the first candidate beamforming profile is selected. On the other hand, if it is determined that the first beamforming performance estimation is less than the second beamforming performance estimation, the profile selection module 122 increases a second probability that the second candidate beamforming profile is selected. Thus, the profile selection module 122 may select the first candidate beamforming profile with the first increased probability or the second candidate beamforming profile with the second increased probability.

In some embodiments, the profile selection module 122 may employ the improved policy (i.e., new policy) of action selection, as represented by the Equation (8):

$$\text{new policy } \pi(s_t, a_t|\overline{M}_s) = \begin{cases} a_t \text{ with } Prob(a_t|\overline{M}_s), \text{ with probability } \varepsilon \\ \max_a Q(s_t, a_t), \text{ with probability } 1-\varepsilon \end{cases} \quad (8)$$

where $\overline{M}_s$ represents the aggregated measurement information for a state $s_t$,
$\pi(s_t, a_t|\overline{M}_s)$ represents the policy of selecting an action at a given state with the observed measurement information $\overline{M}_s$,
$Prob(a_t|\overline{M}_s)$ represents the probability that an action $a_t$ is selected.

For example, $Prob(a_t|\overline{M}_s)$ may be defined by the Equation (9):

$$Prob(a_t|\overline{M}_s) = \frac{V\_predict(a_t)}{\Sigma_a V\_predict(a_t)} \quad (9)$$

where $V\_predict(a_t)$ represents the predicted objective value corresponding to the action $a_t$ and $V\_predict(a_t)$ is obtained from the performance estimation module 124.

ε is a probability, which may be changed in range of [0, 1]. ε may be fixed value. Alternatively, ε may be a dynamic changed value. That is, ε may be set to a higher value in the exploration phase and then gradually decrease to a small value when the current state converges to the optimal broadcast beamforming profile for the stable distribution of terminal devices and traffic.

Referring back to FIG. 4, in some embodiments, the performance estimation module 124 may use an Artificial Neural Network (ANN) with input layer, hidden layers and output layer. For example, back propagation learning algorithm may be used to generate the optimal neural weights and then optimize the accuracy of the performance prediction or estimation.

In some embodiments, the performance estimation module 124 may use the list of mMIMO specific spatial measurement information $\overline{M}_s$, which may comprises at least one of CQI, MCS, traffic volume, scheduling grants, MU-MIMO pairing ratio distribution at the grid of horizontal angle or vertical angles as the input information. The output layer is the predicted or estimated beamforming performance, such as cell throughput or user throughput.

It should be noted that the above list of mMIMO specific spatial measurement information M lists the potential mMIMO measurement information. However, this does not mean these complete set of measurement information is required in some specific scenario. For example, in case when the network device 110 has limited processing capability due to hardware constraints or transport resource limitation, part of the list may be selected. For example, the network device 110 may select CQI and traffic volume distribution only.

During the initialization phase, the performance estimation module 124 may initialize ANN weights $\overline{W}$ with pre-trained parameters or the parameters acquired at the previous round optimization.

During the performance measurement phase, once the performance estimation module 124 receives the certain amount of performance measurement information, it can predict the objective values such as cell throughput for the potential new broadcast beamforming profiles and then initialize the Q (s, a) values with predicted values rather than random values. Then, this can accelerate the convergence of Q-learning algorithm afterwards.

The performance estimation module 124 may use the performance measurement information as the training data for the optimization of ANN weights and continue the training so as to improve the training result. It should be noted that the ANN training can be performed in an on-line way even when there is no Q-learning state change as long as the performance measurement information can be received in the current state. Such kind of on-line training can improve the accuracy of predicting objective values.

For the gradient descent optimization of ANN weights, the loss function of ANN can be defined as the mean squared error of predicted objective value (e.g. cell throughput) and the observed value in the performance measured data.

Figure 7:
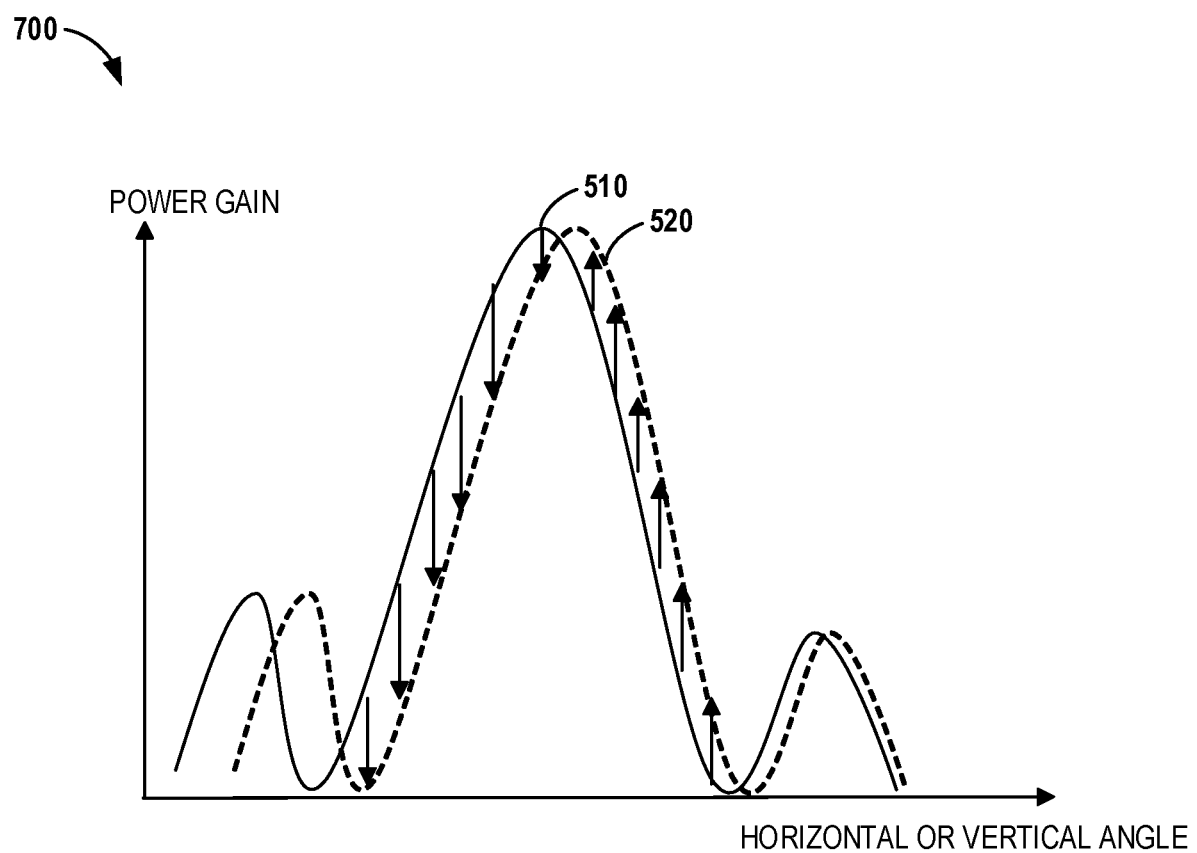
FIG. 7 shows a schematic diagram of a change in a beamforming power gain vector in accordance with some example embodiments of the present disclosure.

In some embodiments, the electronic device 120 may optionally comprise a power difference determination module 128. The power difference determination module 128 may be configured to obtain the initial beamforming profile and a candidate beamforming profile from the profile selection module 122. The power difference determination module 128 may be further configured to determine a power difference vector ($\Delta \overline{P}$) in the grid of vertical or horizontal angles between a beamforming power gain vector ($\overline{P}_s$) for the initial beamforming profile and a beamforming power gain vector ($\overline{P}_{s'}$) for the candidate beamforming profile. FIG. 7 shows a schematic diagram 700 of a change in a beamforming power gain vector in accordance with some example embodiments of the present disclosure. In FIG. 7, a curve 710 represents the beamforming power gain vector ($\overline{P}_s$) for the initial beamforming profile, and a curve 720 represents the beamforming power gain vector ($\overline{P}_{s'}$) for the candidate beamforming profile.

The power difference vector ($\Delta \overline{P}$) can impact on CQI, MCS and then further impact the throughput or spectrum efficiency after the broadcast beamforming profile is changed. Thus, the performance estimation module 124 may estimate a change in the measurement information based on the power difference vector ($\Delta \overline{P}$) from the module 128. In turn, the performance estimation module 124 may determine, based on the measurement information and the estimated change, a beamforming performance estimation in case where the candidate beamforming profile is used in the broadcast area.

According to some embodiments of the present disclosure, Machine Learning method can be exploited to perform the broadcast beam optimization automatically so as to get the optimal cell edge with neighbor cells and then achieve the optimum coverage, capacity and performance optimization.

According to some embodiments of the present disclosure, the dynamic adjusting of broadcast beamforming profiles can be adaptive to the change of coverage, traffic, interference, MU-MIMO gain and then improve not only the coverage but also capacity and the other KPIs. Considering that mMIMO can support higher capacity than non-mMIMO, such kind of optimization can not only exploit the merit of mMIMO but also balance the cell load and performance in a flexible way.

The dynamic adjusting of broadcast beamforming profiles can also be performed on mMIMO network devices for quick convergence of optimization thanks to the integrated Deep Neural Network for the prediction of mMIMO performance for each adjusting step of broadcast beamforming profile. Therefore, embodiments of the present disclosure can support the distributed per-broadcast area optimization for broadcast beamforming profiles whatever inter-broadcast area information exchange is available or not.

Figure 8:
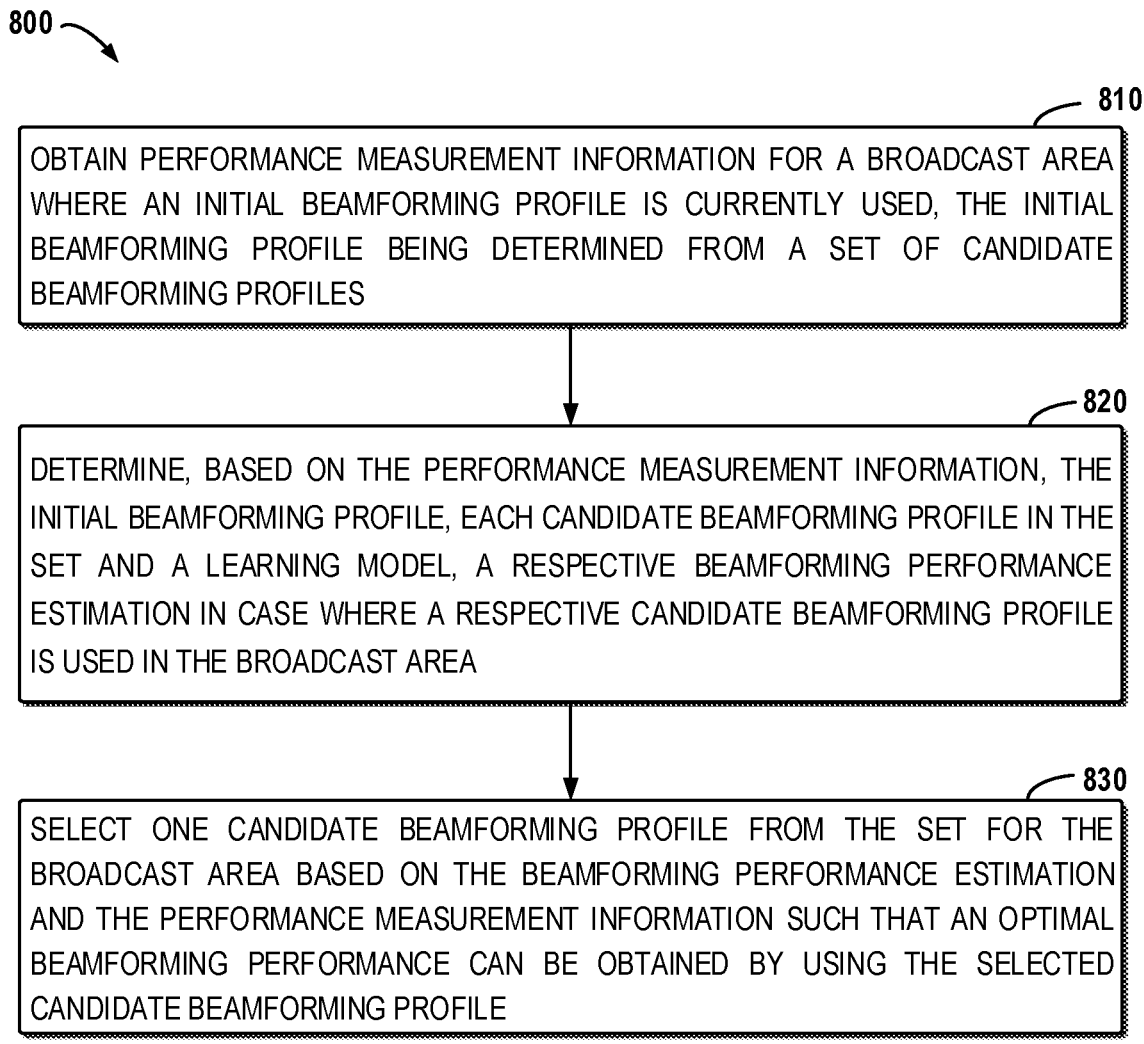
FIG. 8 is a flowchart of a communication method in accordance with some embodiments of the present disclosure.

FIG. 8 shows a flowchart of an example method 800 of adjusting beamforming profiles in accordance with some embodiments of the present disclosure. The method 800 can be implemented at the electronic device 120 as shown in FIG. 3. For the purpose of discussion, the method 800 will be described from the perspective of the electronic device 120 as shown in FIG. 3. It is to be understood that the method 800 may include additional blocks not shown and/or may omit some blocks as shown, and the scope of the present disclosure is not limited in this regard.

As shown, at block 810, the electronic device 120 obtains performance measurement information for a broadcast area where an initial beamforming profile is currently used. The initial beamforming profile is previously determined from a set of candidate beamforming profiles.

At block 820, the electronic device 120 determines, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance.

At block 830, the electronic device 120 selects one candidate beamforming profile from the set for the broadcast area based on the beamforming performance estimation and the performance measurement information such that an optimal beamforming performance can be obtained by using the selected candidate beamforming profile.

In some embodiments, determining the respective beamforming performance estimation comprises: determining a difference between a beamforming power gain vector for the initial beamforming profile and a beamforming power gain vector for a first candidate beamforming profile in the set; estimating a change in the measurement information based on the difference; and determining, based on the measurement information and the estimated change, a first beamforming performance estimation in case where the first candidate beamforming profile is used in the broadcast area.

In some embodiments, selecting the one candidate beamforming profile comprises: comparing a second beamforming performance estimation in case where a second candidate beamforming profile is used in the broadcast area with a third beamforming performance estimation in case where a third candidate beamforming profile is used in the broadcast area; in response to a determination that the second beamforming performance estimation is greater than the third beamforming performance estimation, increasing a first probability that the second candidate beamforming profile is selected; in response to a determination that the second beamforming performance estimation is less than the third beamforming performance estimation, increasing a second probability that the third candidate beamforming profile is selected; and selecting the second candidate beamforming profile with the first increased probability or the third candidate beamforming profile with the second increased probability.

In some embodiments, the method 800 further comprises updating the learning model with the measurement information.

In some embodiments, each of the measurement information, the historical measurement information and the beamforming performance is associated with spatial distribution information of terminal devices in the broadcast area.

In some embodiments, an apparatus for performing the method 800 (for example, the electronic device 120) may comprise respective means for performing the corresponding steps in the method 800. These means may be implemented in any suitable manners. For example, it can be implemented by circuitry or software modules.

In some embodiments, the apparatus comprises: means for obtaining performance measurement information for a broadcast area where an initial beamforming profile is currently used, the initial beamforming profile being determined from a set of candidate beamforming profiles; means for determining, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance; and means for selecting one candidate beamforming profile from the set for the broadcast area based on the beamforming performance estimation and the performance measurement information such that an optimal beamforming performance can be obtained by using the selected candidate beamforming profile.

In some embodiments, means for determining the respective beamforming performance estimation comprises: means for determining a difference between a beamforming power gain vector for the initial beamforming profile and a beamforming power gain vector for a first candidate beamforming profile in the set; means for estimating a change in the measurement information based on the difference; and means for determining, based on the measurement information and the estimated change, a first beamforming performance estimation in case where the first candidate beamforming profile is used in the broadcast area.

In some embodiments, means for selecting the one candidate beamforming profile comprises: means for comparing a second beamforming performance estimation in case where a second candidate beamforming profile is used in the broadcast area with a third beamforming performance estimation in case where a third candidate beamforming profile is used in the broadcast area; means for increasing a first probability that the second candidate beamforming profile is selected in response to a determination that the second beamforming performance estimation is greater than the third beamforming performance estimation; means for increasing a second probability that the third candidate beamforming profile is selected in response to a determination that the second beamforming performance estimation is less than the third beamforming performance estimation; and means for selecting the second candidate beamforming profile with the first increased probability or the third candidate beamforming profile with the second increased probability.

In some embodiments, the apparatus further comprises means for updating the learning model with the measurement information.

In some embodiments, each of the measurement information, the historical measurement information and the beamforming performance is associated with spatial distribution information of terminal devices in the broadcast area.

Figure 9:
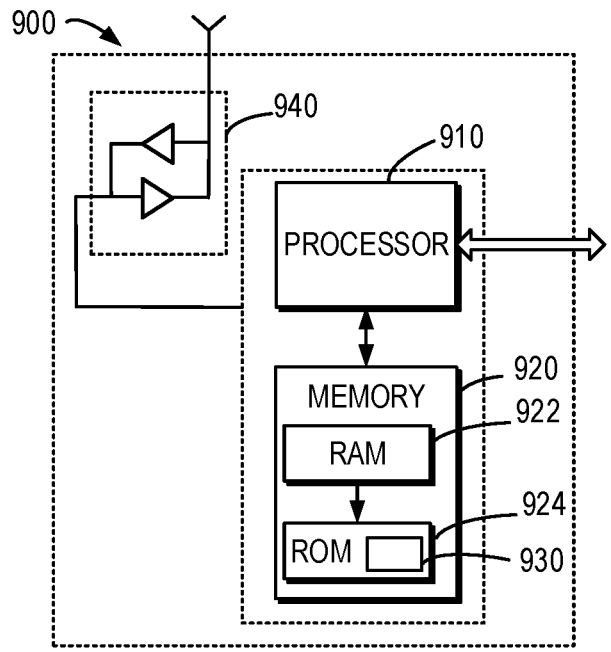
FIG. 9 illustrates a simplified block diagram of a device that is suitable for implementing embodiments of the present disclosure.

FIG. 9 is a simplified block diagram of a device 900 that is suitable for implementing embodiments of the present disclosure. The device 900 may be provided to implement the device, for example the network device 110 or the electronic device 120 as shown in FIG. 3. As shown, the device 900 includes one or more processors 910, one or more memories 940 coupled to the processor 910, and one or more transmitters and/or receivers (TX/RX) 940 coupled to the processor 910.

The TX/RX 940 is for bidirectional communications. The TX/RX 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 3 to 8. The embodiments of the present disclosure may also be implemented by hardware or by a combination of software and hardware.

Figure 10:
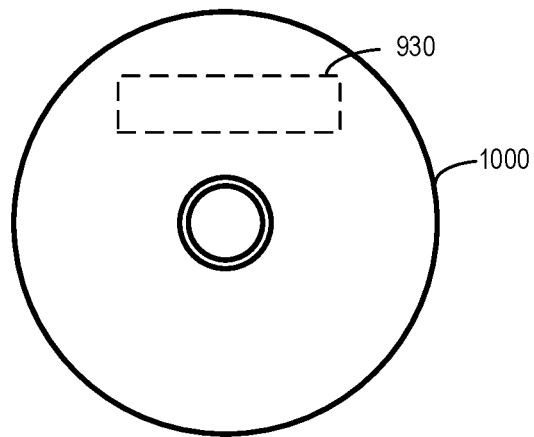
FIG. 10 illustrates a block diagram of an example computer readable medium in accordance with some embodiments of the present disclosure.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. For example, in some embodiments, various examples of the present disclosure (e.g., a method, apparatus or device) may be partly or fully implemented on the computer readable medium. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The units included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

As examples, embodiments of the present disclosure may be described in the context of the computer-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, a computer readable medium may be any tangible medium that may contain, or store a program for use by or in connection with an instruction execution system, apparatus, or device. The computer readable medium may be a machine readable signal medium or a machine readable storage medium. The computer readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain cases, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it would be appreciated that the present disclosure defined in the appended claims is not necessarily limited to the specific features or acts described above. Rather, the specific features and acts described above are disclosed as example forms of implementing the claims.

What is claimed is:

1. An electronic device, comprising:
at least one processor; and
at least one memory including computer program code;
the at least one memory and the computer program code configured to, with the at least one processor, cause the electronic device to:
obtain performance measurement information for a broadcast area where an initial beamforming profile is currently used, the initial beamforming profile being determined previously from a set of candidate beamforming profiles;
determine, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance, and wherein to determine the respective beamforming performance estimation includes to
determine a difference between a beamforming power gain vector for the initial beamforming profile and a beamforming power gain vector for a first candidate beamforming profile in the set,
estimate a change in the measurement information based on the difference, and
determine, based on the measurement information and the estimated change, a first beamforming performance estimation in case where the first candidate beamforming profile is used in the broadcast area; and
select one candidate beamforming profile from the set for the broadcast area based on the beamforming performance estimation and the performance measurement information such that an optimal beamforming performance can be obtained by using the selected candidate beamforming profile.

2. The electronic device of claim 1, wherein the electronic device is caused to select one candidate beamforming profile from the set by:
comparing a second beamforming performance estimation in case where a second candidate beamforming profile is used in the broadcast area with a third beamforming performance estimation in case where a third candidate beamforming profile is used in the broadcast area;
in response to a determination that the second beamforming performance estimation is greater than the third beamforming performance estimation, increasing a first probability that the second candidate beamforming profile is selected;
in response to a determination that the second beamforming performance estimation is less than the third beamforming performance estimation, increasing a second probability that the third candidate beamforming profile is selected; and
selecting the second candidate beamforming profile with the first increased probability or the third candidate beamforming profile with the second increased probability.

3. The electronic device of claim 1, wherein the electronic device is further caused to update the learning model with the measurement information.

4. The electronic device of claim 1, wherein each of the measurement information, the historical measurement information and the beamforming performance is associated with spatial distribution information of terminal devices in the broadcast area.

5. A method for communications, comprising:
obtaining performance measurement information for a broadcast area where an initial beamforming profile is currently used, the initial beamforming profile being determined previously from a set of candidate beamforming profiles;
determining, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance, and wherein determining the respective beamforming performance estimation includes
determining a difference between a beamforming power gain vector for the initial beamforming profile and a beamforming power gain vector for a first candidate beamforming profile in the set,
estimating a change in the measurement information based on the difference, and
determining, based on the measurement information and the estimated change, a first beamforming performance estimation in case where the first candidate beamforming profile is used in the broadcast area; and
selecting one candidate beamforming profile from the set for the broadcast area based on the beamforming performance estimation and the performance measurement information such that an optimal beamforming performance can be obtained by using the selected candidate beamforming profile.

6. The method of claim 5, wherein selecting the one candidate beamforming profile comprises:
comparing a second beamforming performance estimation in case where a second candidate beamforming profile is used in the broadcast area with a third beamforming performance estimation in case where a third candidate beamforming profile is used in the broadcast area;
in response to a determination that the second beamforming performance estimation is greater than the third beamforming performance estimation, increasing a first probability that the second candidate beamforming profile is selected;
in response to a determination that the second beamforming performance estimation is less than the third beamforming performance estimation, increasing a second probability that the third candidate beamforming profile is selected; and
selecting the second candidate beamforming profile with the first increased probability or the third candidate beamforming profile with the second increased probability.

7. The method of claim 5, further comprising:
updating the learning model with the measurement information.

8. The method of claim 5, wherein each of the measurement information, the historical measurement information and the beamforming performance is associated with spatial distribution information of terminal devices in the broadcast area.

9. An apparatus for communications, comprising:
   means for obtaining performance measurement information for a broadcast area where an initial beamforming profile is currently used, the initial beamforming profile being determined previously from a set of candidate beamforming profiles;
   means for determining, based on the performance measurement information, the initial beamforming profile, each candidate beamforming profile in the set and a learning model, a respective beamforming performance estimation in case where a respective candidate beamforming profile is used in the broadcast area, wherein the learning model specifies an association between historical measurement information for the broadcast area and beamforming performance, and wherein means for determining the respective beamforming performance estimation comprises:
      means for determining a difference between a beamforming power gain vector for the initial beamforming profile and a beamforming power gain vector for a first candidate beamforming profile in the set,
      means for estimating a change in the measurement information based on the difference, and
      means for determining, based on the measurement information and the estimated change, a first beamforming performance estimation in case where the first candidate beamforming profile is used in the broadcast area; and
   means for selecting one candidate beamforming profile from the set for the broadcast area based on the beamforming performance estimation and the performance measurement information such that an optimal beamforming performance can be obtained by using the selected candidate beamforming profile.

10. The apparatus of claim 9, wherein means for selecting the one candidate beamforming profile comprises:
    means for comparing a second beamforming performance estimation in case where a second candidate beamforming profile is used in the broadcast area with a third beamforming performance estimation in case where a third candidate beamforming profile is used in the broadcast area;
    means for increasing a first probability that the second candidate beamforming profile is selected in response to a determination that the second beamforming performance estimation is greater than the third beamforming performance estimation;
    means for increasing a second probability that the third candidate beamforming profile is selected in response to a determination that the second beamforming performance estimation is less than the third beamforming performance estimation; and
    means for selecting the second candidate beamforming profile with the first increased probability or the third candidate beamforming profile with the second increased probability.

11. The apparatus of claim 9, further comprising:
    means for updating the learning model with the measurement information.

12. The apparatus of claim 9, wherein each of the measurement information, the historical measurement information and the beamforming performance is associated with spatial distribution information of terminal devices in the broadcast area.

* * * * *